United States Patent [19]
Hall

[11] Patent Number: 4,520,793
[45] Date of Patent: Jun. 4, 1985

[54] FOLDABLE, INSULATED SOLAR WATER HEATER

[76] Inventor: Charles P. Hall, 5815 Bennett Valley Rd., Santa Rose, Calif. 95404

[21] Appl. No.: 517,277

[22] Filed: Jul. 26, 1983

[51] Int. Cl.³ .............................................. F24J 3/02
[52] U.S. Cl. .................................... 126/426; 126/444; 126/450; 126/451; 126/437
[58] Field of Search ................ 126/417, 426, 444, 451, 126/450, 437

[56] References Cited

U.S. PATENT DOCUMENTS 4,036,209  7/1977  Press .................................. 126/426 X
4,122,829  10/1978  Lowe et al. .......................... 126/450

FOREIGN PATENT DOCUMENTS 2025602  1/1980  United Kingdom ................ 126/426
2034876  6/1980  United Kingdom ................ 126/426

OTHER PUBLICATIONS

"The Sunshower" (advertisment), *Basic Designs Brochure Box* 479, Muir Beach, Sausalito, CA 94965, (No Date).

*Primary Examiner*—Larry Jones
*Attorney, Agent, or Firm*—Jeffrey G. Sheldon

[57] ABSTRACT

A foldable, flexible container for heating water has first and second side walls. The first side wall is clear and the second side wall comprises an inner layer of dark plastic, an outer layer of reflective plastic, and a middle layer of flexible insulating foam sandwiched between the inner and outer layers.

3 Claims, 2 Drawing Figures

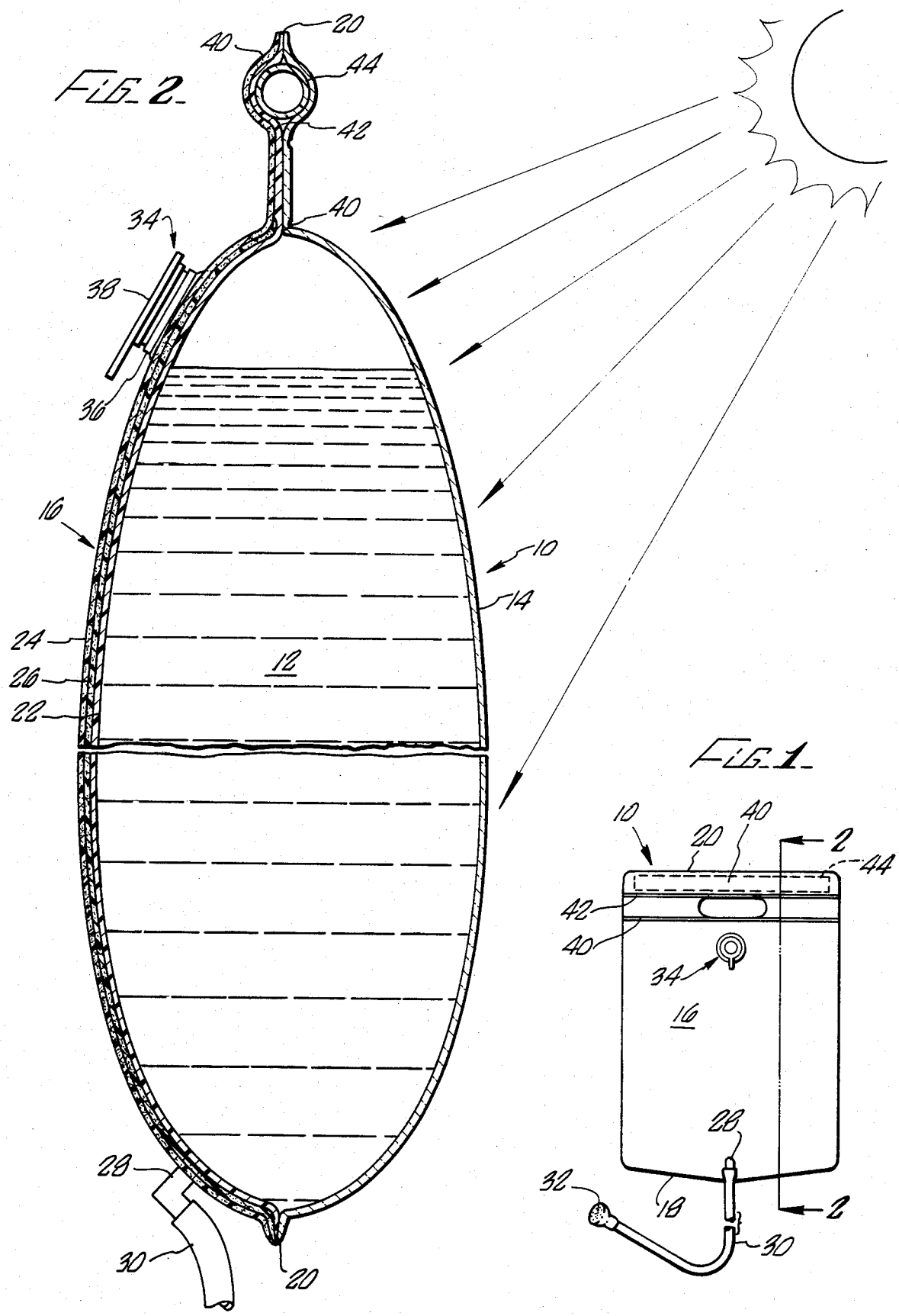

FOLDABLE, INSULATED SOLAR WATER HEATER

BACKGROUND

The present invention is directed to heaters useful for heating water with solar energy.

Efforts have been directed to providing sailors, campers, backpackers, and the like with a portable water heater that relies on solar energy for heating the water. Such a unit is commercially available from Basic Designs, Inc. of Sausalito, Calif., under the trademark Sun Shower. The Sun Shower heater comprises two sheets of plastic peripherally bonded to each other, one sheet being clear and the other sheet being black. By hanging the Sun Shower heater in the sun with the clear side facing the sun, water is quickly heated.

Although the Sun Shower heater has proven to be effective, a more efficient heater would be desirable for certain conditions. For example, on cold days and on days with only limited sunshine, it may not be possible to heat water to a sufficiently high temperature with the Sun Shower heater to take a comfortable shower. Therefore, there is a need for a solar water heater that maintains the advantages of the Sun Shower heater, yet more efficiently and effectively heats water.

SUMMARY

The present invention is directed to a heater that meets these requirements. The heater is foldable, lightweight, and flexible so that it can easily be used by backpackers and the like. The heater is a container that comprises two opposed side walls that are preferably peripherally bonded to each other to form a bag.

The first side wall is formed of clear, flexible plastic. The second side wall comprises three layers, (i) an inner layer of dark, flexible plastic; (ii) an outer layer of reflective flexible plastic; and (iii) a middle layer of flexible insulating foam sandwiched between the inner and outer layers.

The heater also includes an inlet and outlet for placing water into and removing water from the container.

By placing the heater in the sun with the clear wall facing the sun, water in the heater is quickly heated to temperatures in excess of 100° F. Because of the insulating foam and the outer layer of reflective flexible plastic, faster heating to higher temperatures is possible with the heater of the present invention than is possible with the Sun Shower heater, particularly at low ambient temperatures.

DRAWINGS

The and other features, aspects, and advantages of the present invention will become better understood with reference to the following description, appended claims, and accompanying drawings where:

FIG. 1 is a front elevation view of a heater according to the present invention; and FIG. 2 is a sectional view of the heater of FIG. 1 taken on line 2—2 of FIG. 1.

DESCRIPTION

A foldable, flexible 10 for heating water 12 is shown in FIGS. 1 and 2. The container 10 is specially adapted to be used as a shower, as described below, and will be referred to herein as a shower.

The shower 10 has a front wall 14 and a rear wall 16. Each wall is generally rectangular (see FIG. 1) with a slight downward slope toward the middle of the bottom 18 to assist in draining. The two walls 14 and 16 are bonded together at their periphery by a peripheral heat seal weld 20.

The front wall 14 is formed of clear, flexible plastic.

The rear wall 16 comprises three layers, an inner layer 22, an outer layer 24, and a middle layer 26 sandwiched between the inner layer 22 and the outer layer 24.

The inner layer 22 is formed of a dark flexible plastic. The outer layer 24 is formed of a reflective, flexible plastic. The middle layer 26 is made of a flexible, insulating foam.

Preferably the same base plastic is used for the front wall 14, inner layer 22, and outer layer 24 so that the front and rear walls can be easily secured together. Suitable plastics include polyethylene and polyvinylchloride, with polyvinylchloride being preferred.

Preferably the front wall 14 is at least 10 mils thick and preferably the inner layer 22 and the outer layer 24 of the rear wall 16 are each at last 5 mils thick so that the shower 10 can hold large volumes of water. Preferably the front wall 14 is less than 30 mils thick and the inner layer 22 and outer layer 24 of the rear wall 16 are each less than about 20 mils thick, because, as the thickness of the walls of the container 10 increases, it becomes heavier, which is disadvantageous for backpackers, and the container 10 becomes less flexible. Further, as the front wall 10 becomes thicker, less solar energy reaches the water 12 in the shower 10.

The inner layer 22 of the rear wall 16 can be formed of polyvinylchloride that has been pigmented black. The outer layer 24 of the rear wall 16 can be formed of polyvinlychloride that has been pigmented with a silver, metallic colored pigment.

Preferably the inner layer 26 is at least 1/32" in thickness to obtain significant heat retention. Preferably the inner layer 26 is less than ½" thick because thicker layers add litle to the efficiency of the shower 10 but increase its weight.

An outlet 28 is provided at the bottom 18 of the rear wall 16. Attached to the outlet 28 is an elongated tube 30 to which there can be attached a shower nozzle 32. The nozzle 32 can have a built-in shut off, or a clamp (not shown) can be provided to clamp off the tube 30.

Toward the top of the rear wall there is provided an inlet 34 comprising an opening through the rear wall, a reinforcing ring 36 around the cicular opening, and a hinged cap 38 for plugging the opening. A suitable inlet having a reinforcing ring 36 and cap 38 is described in U.S. Pat. No. 2,777,490 and is available from Halkey-Roberts Corp. of St. Petersburg, Fla.

Below the top 40 of the container 10 are two parallel, vertically spaced apart welds, a lower weld 40 and a middle weld 42. Between the lower weld 40 and middle weld 42 in the middle portion of the bag, the front 14 and rear 16 welds are cut out to provide an elongated opening for hanging the shower 10.

In the region between the middle weld 42 and the top 43 of the shower 10 an elongated, rigid plastic tube 44 is held between the front and rear walls. A rope (not shown) can be placed through the tube 44 for hanging the shower 10.

The middle layer 26 is made of insulating material, preferably a polymeric foam such as polyurethane foam or polyethlene foam. The foam is trapped between the inner layer 22 and the outer layer 24. The foam need not be bonded or heat welded to the inner and outer layers, although it can be.

To use the shower 10, it is filled with water and placed on a flat surface with the clear front wall 14 exposed to direct sunlight. Sunlight passes through the clear wall 14 but because of the energy absorbing, dark inner layer 22 of the rear wall 16 and the "greenhouse" effect, the water 12 in the shower 10 heats. Heat loss to the surroundings is reduced because of the insulating foam layer 26 and the reflective outer layer 24. In less than three hours, it is possible to heat 2½ gallons of water to over 100° F. when the ambient temperature is 70° F.

EXAMPLE

A shower as shown in FIGS. 1 and 2 is about 19" tall and 13" wide, it has a capacity of about 2½ gallons of water. The front wall is formed of 18 gauge clear polyvinylchloride. The inner layer 22 of the rear wall is formed from 10–12 mil thick black polyvinylchloride. The outer layer 24 of the rear wall 16 is formed from 10–12 mil silver (metallic) colored vinyl available from Goss Plastic of Los Angeles, Calif.

The middle layer 26 is made of 1/32" polyurethane microcellular cushion foam available from Fancon, Inc. of Pomona, Calif., Catalog No. 301. This material weighs about five ounces per 100 square feet and can be useable in temperatures up to 180° F.

This shower heats up about 10% faster and to a higher temperature and is stronger than the Sun Shower heater.

Athough the present invention has been described in considerable detail with reference to certain preferred versions thereof, other versions are possible. For example, the container 10 can be of shapes other than those shown in the drawing. For example, it can be cubic or spherical. Also, the same hole can be used for the inlet and outlet. Also, the container can be used for heating fluids other than water. Therefore the spirit and scope of the appended claims should not be limited to the description of the preferred versions contained herein.

What is claimed is:

1. A foldable, flexible, unitary body container for heating water with the sun, the container having opposed first and second ends and comprising:
   (a) an outside front wall formed of clear, flexible plastic;
   (b) a rear wall diametrically opposed to the front wall, the rear wall comprising:
      (i) an inner layer of dark flexible plastic;
      (ii) an outer layer of reflective flexible plastic which is reflective on its outer face; and
      (iii) a middle layer of flexible insulating foam sandwiched between the inner and outer layers;
   wherein the front wall and the inner and outer layers of the rear wall are bonded together at their periphery to form a container with a unitary body;
   and wherein the front and rear walls together define a chamber for containing water to be heated such that the water is in direct contact with the front wall and the inner layer of the rear wall; and
   (c) an inlet and an outlet for placing water into and removing water from the container.

2. The container of claim 1 in which the inlet comprises a first hole proximate to the first end of the container and the outlet comprises a second hole proximate to the second end of the container.

3. A foldable, flexible, unitary body container for heating water with the sun, the container having opposed first and second ends and consisting essentially of four layers of flexible material:
   (a) an outside front wall formed of clear, flexible plastic;
   (b) a rear wall diametrically opposed to the front wall, the rear half consisting essentially of three layers: (i) an inner layer of dark flexible plastic, (ii) an outer layer of reflective flexible plastic which is reflective on its outer surface, and (iii) a middle layer of flexible insulating foam sandwiched between the inner and outer layers;
   wherein the front wall and the inner and outer layers of the rear wall are bonded together at their periphery to form a container with a unitary body;
   and wherein the front and rear walls together define a chamber for containing water to be heated such that the water is in direct contact with the front wall and the inner layer of the rear wall;
   the container also comprising:
   (c) an inlet and an outlet for placing water into and removing water from the container, comprising (i) a first hole proximate to the first end of the container, and (ii) a second hole proximate to the second end of the container.

* * * * *